(12) United States Patent
Huang et al.

(10) Patent No.: US 11,714,469 B2
(45) Date of Patent: Aug. 1, 2023

(54) TEMPERATURE CONTROL MANAGEMENT OF ELECTRONIC DEVICE BASED ON NUMBER OF HEAT-EMITTING COMPONENTS IN COMPARTMENT

(71) Applicant: Samsung Electronics Co., Ltd., Suwon-si (KR)

(72) Inventors: Pengda Huang, Allen, TX (US); Jianhua Mo, Allen, TX (US); Boon Loong Ng, Plano, TX (US); Ravindranath Kanamangala, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 992 days.

(21) Appl. No.: 16/503,454

(22) Filed: Jul. 3, 2019

(65) Prior Publication Data

US 2020/0192443 A1   Jun. 18, 2020

Related U.S. Application Data

(60) Provisional application No. 62/779,948, filed on Dec. 14, 2018.

(51) Int. Cl.
*G06F 1/20* (2006.01)
*H01Q 1/00* (2006.01)
(Continued)

(52) U.S. Cl.
CPC .......... *G06F 1/206* (2013.01); *G05D 23/193* (2013.01); *G05D 23/1928* (2013.01); *H01Q 1/00* (2013.01);
(Continued)

(58) Field of Classification Search
None
See application file for complete search history.

(56) References Cited

U.S. PATENT DOCUMENTS 5,369,552 A * 11/1994 Barnes .................. H01L 25/18
361/730
7,464,278 B2   12/2008 Cohen et al.
(Continued)

FOREIGN PATENT DOCUMENTS

| JP | 2005121488 A | 5/2005 |
|---|---|---|
| KR | 10-1495181 B1 | 2/2015 |
| KR | 10-2018-0088776 A | 8/2018 |

OTHER PUBLICATIONS

International Search Report and Written Opinion regarding International Application No. PCT/KR2019/017724, dated Apr. 8, 2020, 8 pages.

(Continued)

*Primary Examiner* — Bernard G Lindsay

(57) ABSTRACT

The present disclosure includes systems and methods for controlling temperature in an electronic device. An electronic device includes a number of heat-emitting components, a plurality of compartments, and a processor. The processor is configured to identify a temperature in one of the compartments of the electronic device, determine whether the identified temperature in the one compartment exceeds a threshold for the one compartment, and in response to determining that the identified temperature for the one compartment exceeds the threshold, modify, based on the identified temperature, operation of a component of the number of heat-emitting components that is located in the one compartment to reduce the temperature in the one compartment.

18 Claims, 10 Drawing Sheets

(51) Int. Cl.
*H04B 1/036* (2006.01)
*G05D 23/19* (2006.01)
(52) U.S. Cl.
CPC ......... *H04B 1/036* (2013.01); *G05D 23/1932* (2013.01); *G05D 23/1934* (2013.01)

(56) References Cited

U.S. PATENT DOCUMENTS

| | | | |
|---|---|---|---|
| 8,108,000 | B2 | 1/2012 | Chang et al. |
| 8,255,004 | B2 | 8/2012 | Huang et al. |
| 8,494,574 | B2 | 7/2013 | Gupta |
| 8,560,004 | B1 | 10/2013 | Tsvetkov et al. |
| 8,768,530 | B2 | 7/2014 | Liang et al. |
| 9,794,380 | B2 | 10/2017 | Kim et al. |
| 10,063,270 | B2 | 8/2018 | Coulter |
| 10,218,422 | B2 | 2/2019 | Raghavan et al. |
| 2006/0178117 | A1 | 8/2006 | Liedtke |
| 2008/0130727 | A1* | 6/2008 | Young ............... H04L 12/66 375/222 |
| 2010/0235014 | A1 | 9/2010 | Liao et al. |
| 2011/0110158 | A1 | 5/2011 | Schuette |
| 2011/0161968 | A1* | 6/2011 | Bash ............... G06F 9/5094 718/102 |
| 2011/0273378 | A1 | 11/2011 | Alameh et al. |
| 2012/0182687 | A1* | 7/2012 | Dighde ............... G06F 1/206 361/692 |
| 2014/0199952 | A1 | 7/2014 | Sandhu et al. |
| 2015/0113303 | A1 | 4/2015 | Jung |
| 2015/0347209 | A1* | 12/2015 | Lyubinin ............... G06F 9/485 719/313 |
| 2016/0044827 | A1* | 2/2016 | Proctor ............... H05K 7/20436 361/692 |
| 2016/0349829 | A1* | 12/2016 | Spiel ............... G06F 1/3212 |
| 2017/0111520 | A1 | 4/2017 | Bowers et al. |
| 2017/0208544 | A1 | 7/2017 | Hunt-Schroeder et al. |
| 2017/0238133 | A1 | 8/2017 | Partheesh et al. |
| 2018/0212823 | A1* | 7/2018 | Su ............... H05K 7/20736 |
| 2018/0252774 | A1* | 9/2018 | Ciaccio ............... B60L 58/10 |
| 2019/0011965 | A1* | 1/2019 | Seyed ............... G06F 1/206 |

OTHER PUBLICATIONS

Supplementary European Search Report dated Jan. 5, 2022 in connection with European Patent Application No. 19 89 6624, 9 pages.

* cited by examiner

TEMPERATURE CONTROL MANAGEMENT OF ELECTRONIC DEVICE BASED ON NUMBER OF HEAT-EMITTING COMPONENTS IN COMPARTMENT

CROSS-REFERENCE TO RELATED APPLICATION(S) AND CLAIM OF PRIORITY

This application claims priority under 35 U.S.C. § 119(e) to U.S. Provisional Patent Application No. 62/779,948 filed on Dec. 14, 2018. The above-identified provisional patent application is hereby incorporated by reference in its entirety.

TECHNICAL FIELD

This disclosure relates generally to temperature control systems. More specifically, this disclosure relates to systems and methods for controlling temperature within a mobile device.

BACKGROUND

In 5G and the other wireless communication systems, mmWave is a major band on which high data throughputs can be achieved. Propagation of electromagnetic (EM) radiation in the mmWave bands suffers more significant path loss than that in the sub-6 GHz bands. To compensate for this increased path loss, multiple antenna elements of a device can be simultaneously used to achieve beamforming. In practice, the power of emitted EM radiation is not fully transferred to the air for various reasons including impedance mismatch and coupling issues between radio frequency (RF) antenna elements. The portion of the EM radiation which fails to be transferred to the air may instead be transferred into other components within a mobile device, thereby heating up the device. This overheating problem may be caused not only by the usage of mmWave RF components, but also the other components which emit heat, such as RF components for sub-6 GHz bands and baseband processors.

SUMMARY

Embodiments of the present disclosure provide systems and methods for controlling temperature within a mobile device.

In one embodiment, an electronic device is disclosed. The electronic device includes a number of heat-emitting components, a plurality of compartments, and a processor. The processor is configured to identify a temperature in one of the compartments of the electronic device, determine whether the identified temperature in the one compartment exceeds a threshold for the one compartment, and in response to determining that the identified temperature for the one compartment exceeds the threshold, modify, based on the identified temperature, operation of a component of the number of heat-emitting components that is located in the one compartment to reduce the temperature in the one compartment.

In a second embodiment, a method is disclosed. The method includes identifying a temperature in one of a plurality of compartments of the electronic device, determining whether the identified temperature in the one compartment exceeds a threshold for the one compartment. The method further includes, in response to determining that the identified temperature for the one compartment exceeds the threshold, modifying, based on the identified temperature, operation of a component of the electronic device located in the one compartment to reduce the temperature in the one compartment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that, in a mobile device with wireless communications capabilities, such as a mobile phone (which may also be known as a terminal or a user equipment (UE)), antennas, antenna modules, or beams may be in operation for a long period of time in order to facilitate wireless communication. During such extended operation of one or more antenna modules or beams, waste heat that is dissipated into the mobile device may cause overheating of the mobile device. If this overheating persists for enough time, some components in the mobile device may be damaged.

The present disclosure provides various embodiments for improving temperature control of a mobile device. For example, the space inside the mobile device can be divided into multiple conceptual spaces (or compartments) based on, for example, a number of heat-emitting components within a compartment, based on the heat tolerance of components within a compartment, or based on both of the above considerations. Each compartment can then be separately monitored for potential overheating, and operation of components within a compartment can be adjusted to reduce the heat dissipated into the compartment.

The present disclosure also provides various ways to monitor temperature within compartments of a mobile device. This includes, for example, using sensors to detect objects near the device that could be blocking heat from dissipating out of the device, estimating the temperature of a compartment based on knowledge of the operation of components within the compartment, or determining the ambient temperature around the device.

Figure 1:
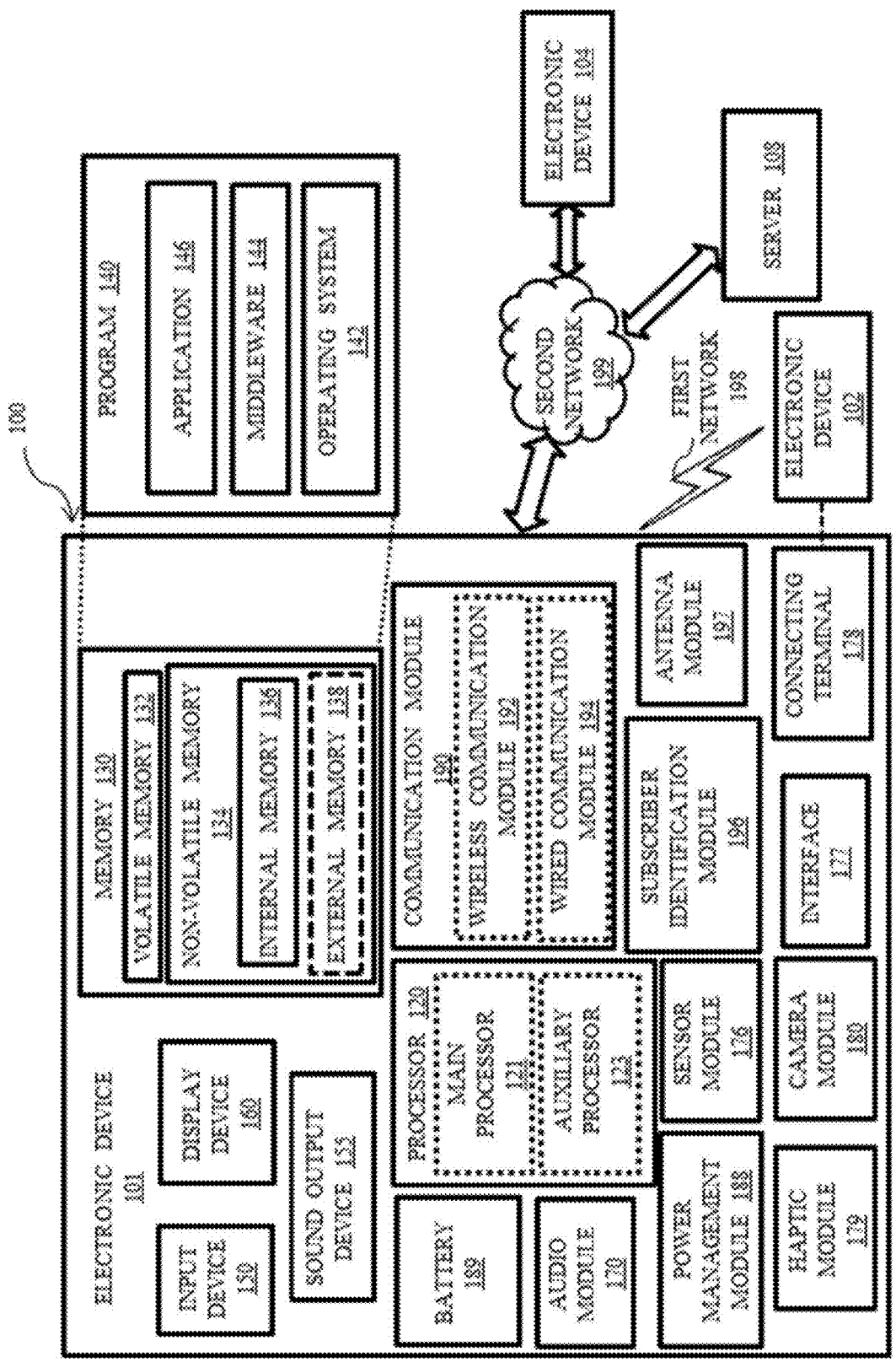
FIG. 1 is a block diagram illustrating an electronic device in a network environment according to illustrative embodiments of the present disclosure.

FIG. 1 is a block diagram illustrating an electronic device 101 in a network environment 100 according to illustrative embodiments of the present disclosure. The electronic device 101 can communicate with an electronic device 102 via a first network 198 (e.g., a short-range wireless communication network), or with an electronic device 104 or a server 108 via a second network 199 (e.g., a long-range wireless communication network. The electronic device 101 may communicate with the electronic device 104 via the server 108. The electronic device 101 can include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components can be omitted from the electronic device 101, or one or more other components can be added in the electronic device 101. In some embodiments, some of the components can be implemented as single integrated circuitry. For example, the sensor module 176 (e.g., a fingerprint sensor, an iris sensor, or an illuminance sensor) can be implemented as embedded in the display device 160 (e.g., a display).

The processor 120 can execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 can load a command or data received from another component (e.g., the sensor module 176 or the communication module 190) in volatile memory 132, process the command or the data stored in the volatile memory 132, and store resulting data in non-volatile memory 134. According to an embodiment, the processor 120 can include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 can be implemented as separate from, or as part of the main processor 121.

The auxiliary processor 123 can control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) can be implemented as part of another component (e.g., the camera module 180 or the communication module 190) functionally related to the auxiliary processor 123.

The memory 130 can store various data used by at least one component (e.g., the processor 120 or the sensor module 176) of the electronic device 101. The various data may include, for example, software (e.g., the program 140) and input data or output data for a command related thereto. The various data may also include mathematical functions relating activation characteristics of components to heat generated by those components, information on historical ambient temperatures at various geographical locations, or other information that facilitates temperature control within the electronic device 101. The memory 130 can include the volatile memory 132 or the non-volatile memory 134.

The program 140 can be stored in the memory 130 as software, and may include, for example, an operating system (OS) 142, middleware 144, or an application 146.

The input device 150 can receive a command or data to be used by other component (e.g., the processor 120) of the electronic device 101, from the outside (e.g., a user) of the electronic device 101. The input device 150 can include, for example, a microphone, a mouse, a keyboard, or a digital pen (e.g., a stylus pen).

The sound output device 155 can output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver can be implemented as separate from, or as part of, the speaker.

The display device 160 can visually provide information to the outside (e.g., to a user) of the electronic device 101. The display device 160 can include, for example, a display, a hologram device, or a projector and control circuitry to control a corresponding one of the display, hologram device, and projector. According to an embodiment, the display device 160 can include touch circuitry adapted to detect a touch, or sensor circuitry (e.g., a pressure sensor) adapted to measure the intensity of force generated by the touch.

The audio module 170 can convert a sound into an electrical signal and vice versa. According to an embodiment, the audio module 170 can obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 can detect an operational state (e.g., power or temperature) of the electronic device 101 or an environmental state (e.g., a state of a user) external to the electronic device 101, and then generate an electrical signal or data value corresponding to the detected state. The sensor module 176 can also detect activation characteristics of antennas or beams (e.g., activation status, activation duration, activation power) or of other components such as processors, display drivers, and the like. According to an embodiment, the sensor module 176 can include, for example, a gesture sensor, a gyro sensor, an atmospheric pressure sensor, a magnetic sensor, an acceleration sensor, a grip sensor, a proximity sensor, a color sensor, an ambient light sensor (ALS), an infrared (IR) sensor, a biometric sensor, a temperature sensor, a humidity sensor, or an illuminance sensor.

The interface 177 can support one or more specified protocols to be used for the electronic device 101 to be coupled with the external electronic device (e.g., the electronic device 102) directly (e.g., wiredly) or wirelessly. According to an embodiment, the interface 177 can include, for example, a high definition multimedia interface (HDMI), a universal serial bus (USB) interface, a secure digital (SD) card interface, or an audio interface.

A connecting terminal 178 can include a connector via which the electronic device 101 may be physically connected with the external electronic device (e.g., the electronic device 102). According to an embodiment, the connecting terminal 178 can include, for example, a HDMI connector, a USB connector, a SD card connector, or an audio connector (e.g., a headphone connector).

The haptic module 179 can convert an electrical signal into a mechanical stimulus (e.g., a vibration or a movement) or electrical stimulus which may be recognized by a user via his tactile sensation or kinesthetic sensation. According to an embodiment, the haptic module 179 can include, for example, a motor, a piezoelectric element, or an electric stimulator.

The camera module 180 can capture a still image or moving images. According to an embodiment, the camera module 180 can include one or more lenses, image sensors, image signal processors, or flashes.

The power management module 188 can manage power supplied to the electronic device 101. According to one embodiment, the power management module 188 can be implemented as at least part of, for example, a power management integrated circuit (PMIC).

The battery 189 can supply power to at least one component of the electronic device 101. According to an embodiment, the battery 189 can include, for example, a primary cell which is not rechargeable, a secondary cell which is rechargeable, or a fuel cell.

The communication module 190 can support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 can include one or more communication processors that are operable independently from the processor 120 (e.g., the application processor (AP)) and supports a direct (e.g., wired) communication or a wireless communication.

In some embodiments, the communication module 190 can include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules can communicate with the external electronic device via the first network 198 (e.g., a short-range communication network, such as BLUETOOTH, wireless-fidelity (Wi-Fi) direct, Ultra-WideBand (UWB), or infrared data association (IrDA)) or the second network 199 (e.g., a long-range communication network, such as a cellular network, the Internet, or a computer network (e.g., LAN or wide area network (WAN)). These various types of communication modules can be implemented as a single component (e.g., a single chip), or can be implemented as multi components (e.g., multi chips) separate from each other. The wireless communication module 192 can identify and authenticate the electronic device 101 in a communication network, such as the first network 198 or the second network 199, using subscriber information (e.g., international mobile subscriber identity (IMSI)) stored in the subscriber identification module 196.

The antenna module 197 can transmit or receive a signal or power to or from the outside (e.g., the external electronic device) of the electronic device 101. According to an embodiment, the antenna module 197 can include an antenna including a radiating element composed of a conductive material or a conductive pattern formed in or on a substrate (e.g., PCB). According to an embodiment, the antenna module 197 can include a plurality of antennas. In such a case, at least one antenna appropriate for a communication scheme used in the communication network, such as the first network 198 or the second network 199, can be selected, for example, by the communication module 190 (e.g., the wireless communication module 192) from the plurality of antennas. The signal or the power can then be transmitted or received between the communication module 190 and the external electronic device via the selected at least one antenna. According to an embodiment, another component (e.g., a radio frequency integrated circuit (RFIC)) other than the radiating element can be additionally formed as part of the antenna module 197.

In some embodiments, commands or data can be transmitted or received between the electronic device 101 and the external electronic device 104 via the server 108 coupled with the second network 199. Each of the electronic devices 102 and 104 can be a device of a same type as, or a different type, from the electronic device 101. According to an embodiment, all or some of operations to be executed at the electronic device 101 can be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request can perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology can be used, for example.

The electronic devices 101, 102, and 104 can be one of various types of electronic devices. The electronic devices 101, 102, and 104 can include, for example, a mobile communication device (e.g., a smartphone), a computer device, a portable multimedia device, a portable medical device, a camera, a wearable device, or a home appliance. Although the below embodiments are disclosed in the context of a mobile communication device, it is understood that the electronic devices are not limited to those described above.

Each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
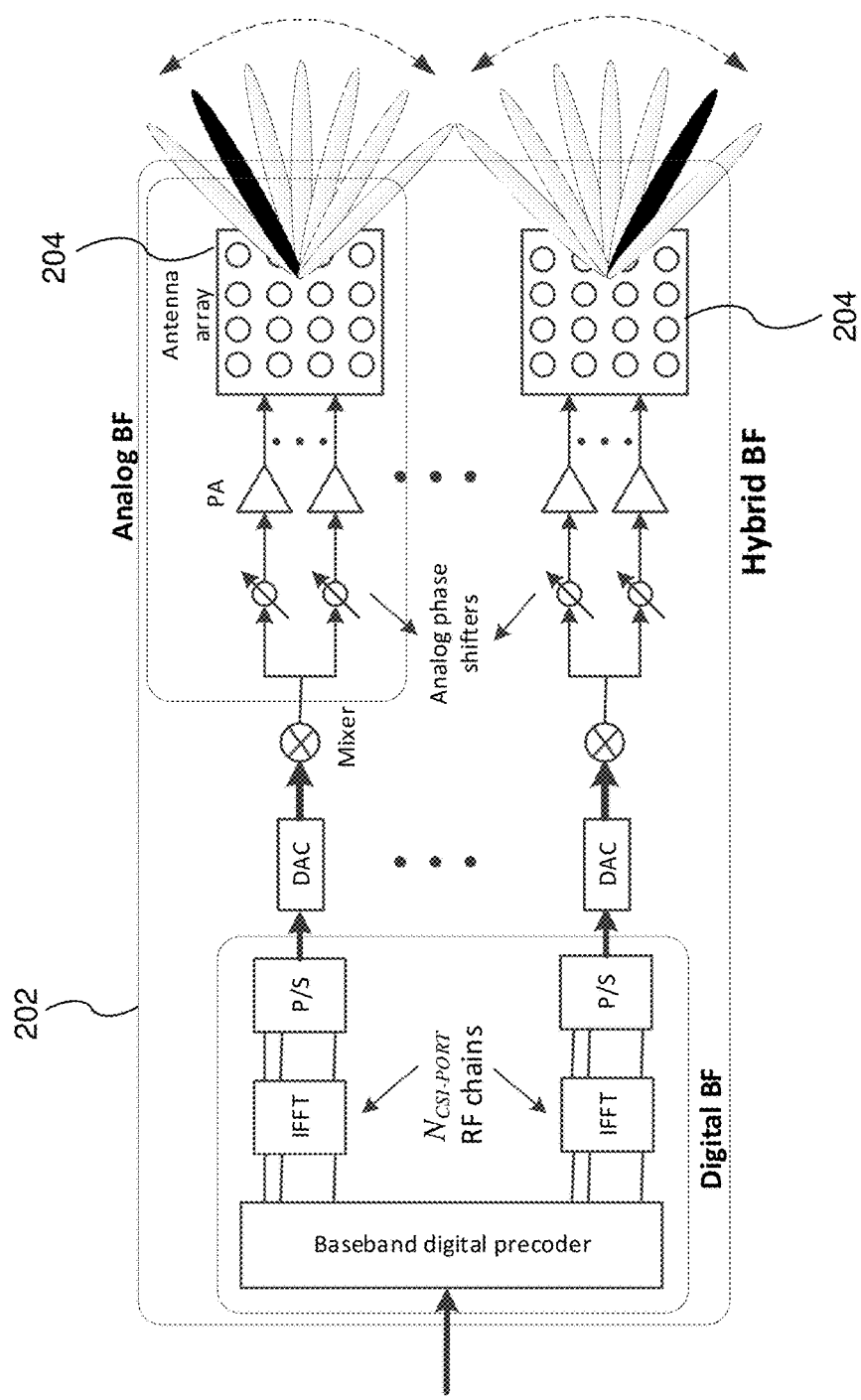
FIG. 2 illustrates an example of hybrid beamforming architecture according to illustrative embodiments of the present disclosure.

FIG. 2 illustrates an example of hybrid beamforming architecture 202 according to illustrative embodiments of the present disclosure. For mmWave bands, the number of antenna elements 204 can be large for a given form factor. However, the number of digital chains can be limited due to hardware constraints (such as the feasibility to install a large number of ADCs or DACs at mmWave frequencies) as illustrated in FIG. 2. In this case, one digital chain is mapped onto a large number of antenna elements 204 which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval. The hybrid beamforming architecture as illustrated in FIG. 2 can be applied at a base station and at a UE.

Some of the EM energy emitted by the antennas of FIG. 2 in order to perform beamforming is absorbed by components of the UE that are near the antenna arrays, thereby generating waste heat. The below disclosure discusses systems and methods for managing the temperature within an electronic device, such as electronic device 101, that includes antennas such as antenna elements 204 of FIG. 2. For convenience, the electronic device will be described below as a mobile device.

Figure 3:
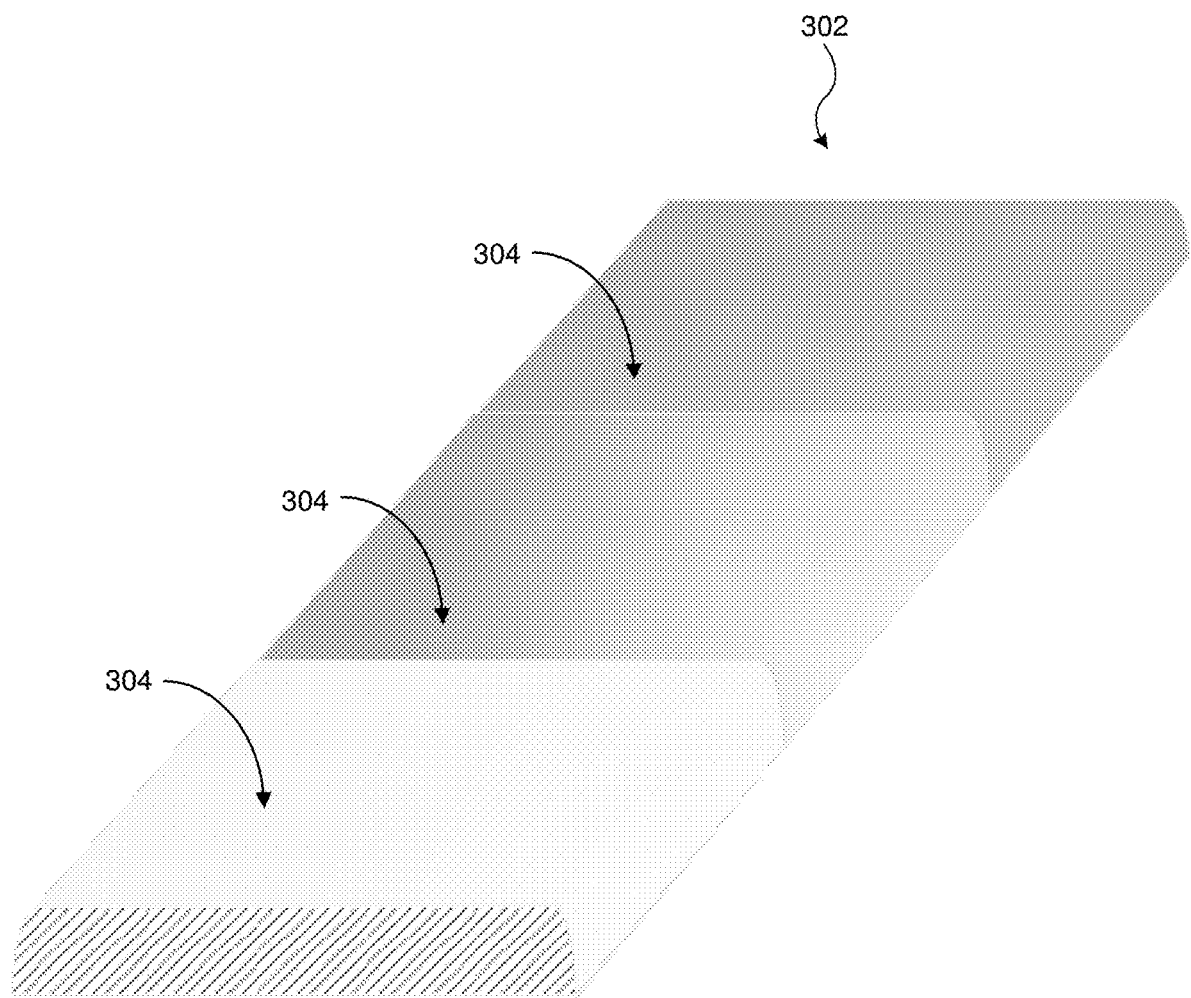
FIG. 3 illustrates an example of compartmentalization of a mobile device according to illustrative embodiments of the present disclosure.

FIG. 3 illustrates an example of compartmentalization of a mobile device according to illustrative embodiments of the present disclosure. An internal space 302 of a mobile device includes a number of heat-emitting components as well as a number of heat-sensitive components. The internal space 302 can be divided into any number of compartments 304. These compartments 304 are not necessarily physically separated from each other. Rather, the compartments 304 can be divided conceptually for the purpose of measuring and managing temperature as described below. Each compartment 304 can include a subset of the heat-emitting and heat-sensitive components. In some embodiments, the compartments 304 are designated such that they do not have any overlapping area with other compartments 304. It is understood that the compartments 304 need not be any regular shape, and need not be of similar shape or size to other compartments 304.

Determination, or identification, of the size and shape of each compartment 304 can be done in multiple ways. Compartments 304 can be determined based on the number or characteristics of heat-emitting components that are included in the compartment. In some embodiments, compartments 304 can be determined such that each compartment 304 contains the same number of heat-emitting components (e.g., if each heat-emitting component is an antenna with similar heat-emitting characteristics). In other embodiments, compartments 304 can be determined based such that the totality of heat-emitting components within each compartment 304 has similar heat-emitting characteristics (e.g., similar expected heat emission under normal operating conditions). Compartments 304 can also be determined based on different levels of tolerance to heat of components within each compartment 304. For example, each compartment 304 may include components that have similar levels of heat-sensitivity (i.e., components that have similar temperature ranges within which they operate properly). In some embodiments, compartments 304 are determined based on consideration of a combination of the characteristics of heat-emitting components and the characteristics of heat-sensitive components. A desired range of operating temperatures for a given compartment 304 can be determined once the size and shape of the compartment 304 has been determined.

The space (or area) 302 can be denoted as W, and the space occupied by each compartment of k compartments can be denoted as $W_k$. In FIG. 3 there are three compartments 304 illustrated, but it is understood that the space 302 could be divided into any number of compartments. After compartments 304 have been determined (or identified), the mobile device can monitor the temperature of each compartment 304 individually. The temperature of a k-th compartment 304 will be denoted as $H_k$. This disclosure includes various embodiments of methods and systems for measuring the temperature of each compartment 304. In some embodiments, the mobile device can simultaneously use multiple of the below embodiments to estimate a candidate temperature value for a given compartment 304 $W_k$, and a final temperature value $H_k$ can be derived based on one or more of the candidate temperature values. For example, $H_k$ can be the mean value of the multiple temperature candidates, or the minimum or maximum value of the multiple temperature candidates. $H_k$ can also be chosen as the x-percentile of the temperature values of the multiple temperature candidates, where $0<x\leq100$.

A number of factors affect the temperature of a mobile device. The activation characteristics of heat-emitting components, such as the activation status (i.e., on or off) of antennas, the activation status of a beamformed beam, the transmission power strength (i.e., the activation power) of an activated beam, or the time duration that an antenna or beam is active for (i.e., the activation duration) can all contribute to the temperature within compartments 304. Additionally, blockage of the antennas or beams by an object near the mobile device can contribute to the temperature within compartments 304. For example, when an antenna or beam is blocked the signal from that antenna or beam may not reach its intended destination, which may cause the mobile device to retransmit with increased transmission power in an attempt to overcome the blockage. This increase in power, in turn, leads to more waste heat generated by the antennas and dissipated into a compartment 304. Factors affecting heat increase due to blockage include the location of a blocking object relative to the mobile device, its distance from the mobile device, and the material of the blocking object. Data processing load can also affect the temperature within compartments 304. For example, if the mobile device is processing a video game, transmitting video data, or performing another computationally intensive task, processor components will heat up and contribute to heat within a compartment 304.

As will be further described below, this disclosure includes various methods for generating temperature candidates. In some embodiments, a temperature candidate for a compartment 304 is generated as a function of the activation characteristics (e.g., the activation status, activation power, or activation duration) of one or more components located in the compartment 304. For example, based on known relationships between the activation characteristics of a component and heat dissipated by the component, a temperature change within a compartment 304 can be estimated based on knowledge of the activation characteristics.

In some embodiments, sensors of the mobile device can be used to generate temperature candidates. This could include the use of temperature sensors as well as other sensors such as proximity sensors, accelerometers, light sensors (e.g., a camera, ALS, or IR sensor), microphones, or the like, which can be used to measure data related to temperature changes in compartments 304. For example, proximity sensors can be used to detect materials that are blocking antennas and causing increased transmission power, which in turn causes increased heat dissipation inside compartments 304.

In other embodiments, data from sources external to the mobile device can be used to generate temperature candidates. For example, data on the ambient temperature in the environment surrounding the mobile device can be used to estimate the temperature inside compartments 304 based on the ambient temperature. The ambient temperature can be determined from weather reports as well as estimated based on historical data (e.g., known temperatures in mobile device's geographic location, as determined based on GPS data).

Once a temperature $H_k$ has been estimated, actions can be taken to reduce the temperature in the space $W_k$. In some embodiments, a threshold temperature for each compartment 304 is identified, and if the temperature $H_k$ is above the threshold for the space $W_k$, actions can be taken to reduce the temperature below the threshold. The value of the threshold can be the highest temperature at which there is no decrease in the quality of the service of the mobile device, the highest temperature at which there is no damage to the hardware or software component of mobile device, the highest temperature at which there is no damage to a user of the mobile device, or the highest temperature at which there is no discomfort caused to the user. The actions taken to reduce temperature can include controlling the activation status (e.g., on, off, or controlling activation power level) of an antenna or beam within the compartment 304, or controlling the activation duration of a component (e.g., an antenna, a beam, or a processor) within the compartment 304.

Figure 4:
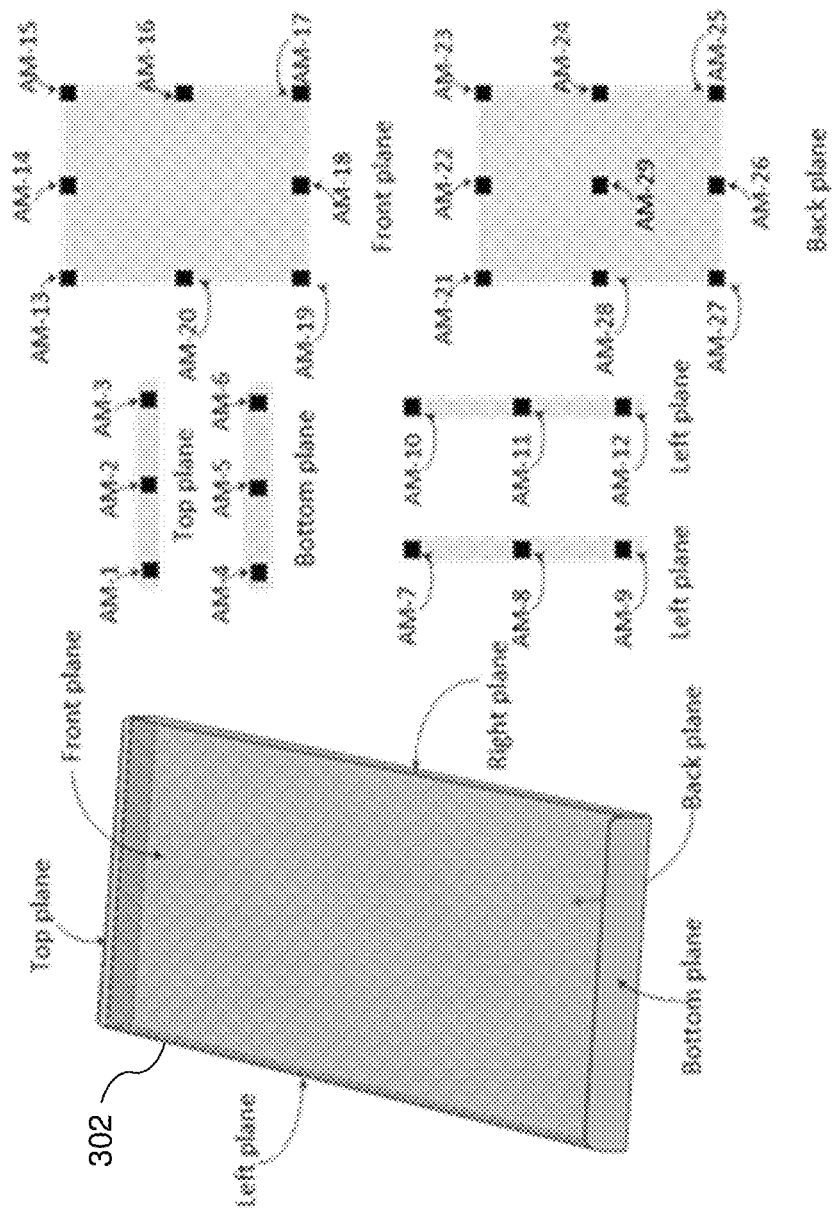
FIG. 4 illustrates an example of antenna locations within a mobile device according to illustrative embodiments of the present disclosure.

FIG. 4 illustrates an example of antenna locations within a mobile device according to illustrative embodiments of the present disclosure. In the embodiment illustrated in FIG. 4, the mobile device has antennas located along the top, bottom, front, back, left, and right planes of the space 302 inside the mobile device. It is understood that in other embodiments, a mobile device can have any number of antennas located in any combination of these planes. These antennas, as disclosed above, each generate waste heat that is dissipated into the space 302 inside the mobile device.

In the embodiment illustrated in FIG. 4, antennas are located in the space 302 at the left of the top edge (AM-1), the middle of the top edge (AM-2), the right of the top edge (AM-3), the left of the bottom edge (AM-4), the middle of the bottom edge (AM-5), the right of the bottom edge (AM-6), the top of the left edge (AM-7), the middle of the left edge (AM-8), the bottom of the left edge (AM-9), the top of the right edge (AM-10), the middle of the right edge (AM-11), the bottom of the right edge (AM-12), the left top of the front plane (AM-13), the middle top of the front plane (AM-14), the right top of the front plane (AM-15), the right middle of the front plane (AM-16), the right bottom of the front plane (AM-17), the middle bottom of the front plane (AM-18), the left bottom of the front plane (AM-19), the left middle of the front plane (AM-20), the left top of the front plane (AM-21), the middle top of the back plane (AM-22), the right top of the back plane (AM-23), the right middle of the back plane (AM-24), the right bottom of the back plane (AM-25), the middle bottom of the back plane (AM-26), the left bottom of the back plane (AM-27), the left middle of the back plane (AM-28), and the center middle of the back plane (AM-29).

Figures 5A, 5B:
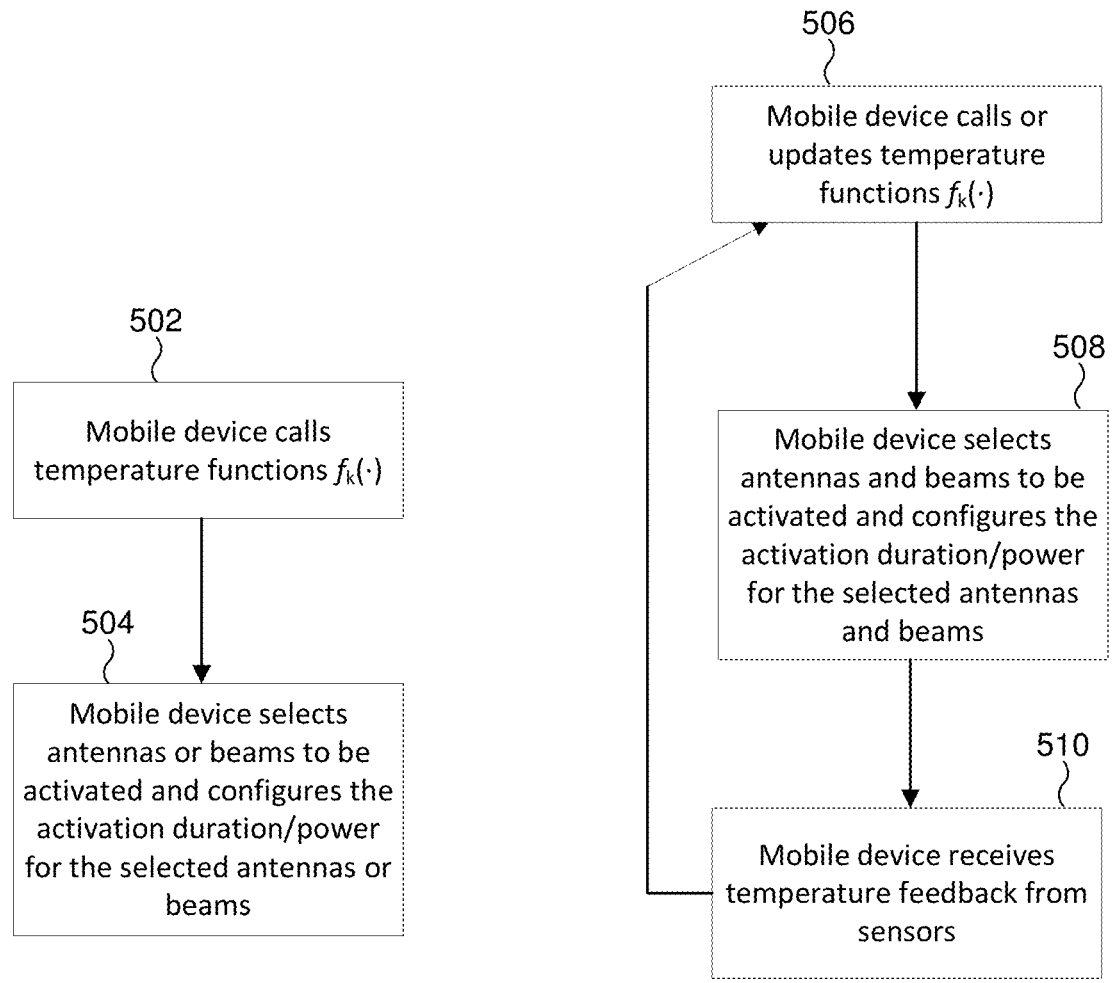
FIGS. 5A and 5B illustrate example processes for temperature estimation and control using activation characteristics (such as activation status, activation time, or activation power) of heat-emitting components of a mobile device according to illustrative embodiments of the present disclosure.

FIGS. 5A and 5B illustrate example processes for temperature estimation and control using activation characteristics (such as activation status, activation time, or activation power) of heat-emitting components of a mobile device according to illustrative embodiments of the present disclosure. In the example of FIGS. 5A and 5B, antennas are the heat-emitting components that are tracked, but it is understood that the same or similar method can be applied to other heat-emitting components (e.g., processors).

The examples of FIGS. 5A and 5B assume that there are N antennas, where N is a positive integer larger than or equal to 1. The set of N antennas is denoted as $\{A_n\}$. There are $L_n$ beams to be generated on an n-th antenna. The set of the $L_n$ beams is denoted by $\{s_n\}$. The combination of the N antennas generates a pool of candidate beams that can be used by the mobile device. S denotes the pool of all the candidate beams for the mobile device, such that $S = \cup_{n=1}^{N} s_n$. The time duration of an antenna or beam being activated (i.e., the activation duration) is denoted by $\Delta t$. The activation power is denoted as $P(A_n, s_l)$.

Temperature control based on the activation characteristics of an antenna or beam can consist of the following steps. First, the connection between the temperature of a compartment 304 of a mobile device and the activated antenna or beam and the activation time or power is calculated. The relationship between the temperature, the activated antenna or beam and the activation duration can be described as a function $f(\bullet)$. Given the activated antenna or beam and the activation duration or power, the temperature can be calculated according to the function $f(\bullet)$.

In one embodiment, the mobile device performs runtime calculation of the temperature based on inputs, such as an activation duration of an activated antenna or beam, according to the function $f(\bullet)$. In another embodiment, outputs of the function $f(\bullet)$ for a range of possible inputs can be calculated beforehand and stored in memory of the mobile device as a lookup table, which enables the mobile device to map inputs to an output temperature without directly calculating the function.

The function $f(\bullet)$ can have other variations. In an embodiment, $f(\bullet)$ can describe a relationship between the temperature of each compartment 304, an activated antenna, an activation duration of the activated antenna, and the activation power of the activated antenna. That is, $f(\bullet)$ can describe the relationship between the temperature of the k-th compartment 304 $W_k$, the n-th antenna $A_n$, the activation duration $\Delta t$, and the activation power $P(A_n, s_l)$. In another embodiment, $f(\bullet)$ can describe a relationship between the temperature of each compartment 304, each beam $s_l$, activation duration $\Delta t$, and activation power $P(A_n, s_l)$. In yet another embodiment, $f(\bullet)$ can describe a relationship between the temperature of each compartment 304, each antenna $A_n$, each beam $s_l$, activation duration $\Delta t$, and the activation power $P(A_n, s_l)$.

A temperature function $f(\bullet)$ can exist for each compartment 304 of a mobile device, where $f_k(\bullet)$ denotes the temperature function of the k-th compartment 304. $f_k(\bullet)$ can be a linear or nonlinear function of one or more of the activated antenna, activated beam, activation duration of the activated beam or antenna, or activation power of the activated beam or antenna. For example, $f_k(\bullet) = g(W_k, A_n, s_l) \cdot P(A_n, s_l) \cdot \Delta t$, where $P(A_n, s_l)$ is the activation power of the antenna $A_n$ transmitting the beam $s_l$, and g $(W_k, A_n, s_l)$ is a function that takes into account the antenna radiation efficiency, heat dissipation, heat capacity, etc. of the antenna $A_n$. $g(W_k, A_n, s_l)$ can be determined based on experimental measurement.

The functions $f_k(\bullet)$ at different values of k can be the same or different from each other. There are various methods of determining $f_k(\bullet)$. In one embodiment, functions $f_k(\bullet)$ can be predicted based on theoretical derivation. For example, the heat emission from an antenna is calculated based on a mathematical formula and the distance from the antenna to the compartment $W_k$ can be calculated. With this emission heat and distance, the temperature at the k-th compartment $W_k$ can be calculated according to the mathematical formula. In another embodiment, functions $f_k(\bullet)$ can be obtained based on software simulation. For example, with simulation software, the temperature at the k-th compartment $W_k$ can be estimated in a simulation wherein the antenna $A_n$ is activated for a duration of $\Delta t$. In yet another embodiment, functions $f_k(\bullet)$ can be determined experimentally. For example, an experiment can be run wherein the antenna $A_n$ operates for a duration of $\Delta t$. Then, temperature at the k-th compartment $W_k$ can be measured and recorded during the experiment.

Once the temperature functions $f_k(\bullet)$ are determined, temperature control can be performed using the functions. A first method, illustrated in FIG. 5A, is based on temperature prediction. A second method, illustrated in FIG. 5B, is based on temperature prediction and calibration using feedback.

Referring now to FIG. 5A, at step 502 a processor of the mobile device calls the temperature functions $f_k(\bullet)$. At step 504, based on the functions $f_k(\bullet)$, the mobile device selects antennas and beams to be activated, and makes a temperature control plan for the activated antennas, beams, and their activation duration and power such that the temperature at any compartment 304 will be no higher than a predetermined threshold. The temperature control plan is based on the temperature functions $f_k(\bullet)$ obtained as described above.

Referring now to FIG. 5B, at step 506 a processor of the mobile device calls the temperature functions $f_k(\bullet)$. At step 508, the processor of the mobile device selects antennas and beams to be activated. The beams can be from the same beam codebook or from different beam codebooks. The processor of the mobile device makes a temperature control plan for the activated antennas, beams, and their activation duration and power such that the temperature at any compartment 304 will be no higher than a predetermined threshold. At step 510 the processor of the mobile device receives input from sensors that provide information that can be used to calibrate the functions $f_k(\bullet)$. Returning to step 506, the processor of the mobile device calibrates the functions $f_k(\bullet)$ based on the feedback from the sensors.

Figure 6:
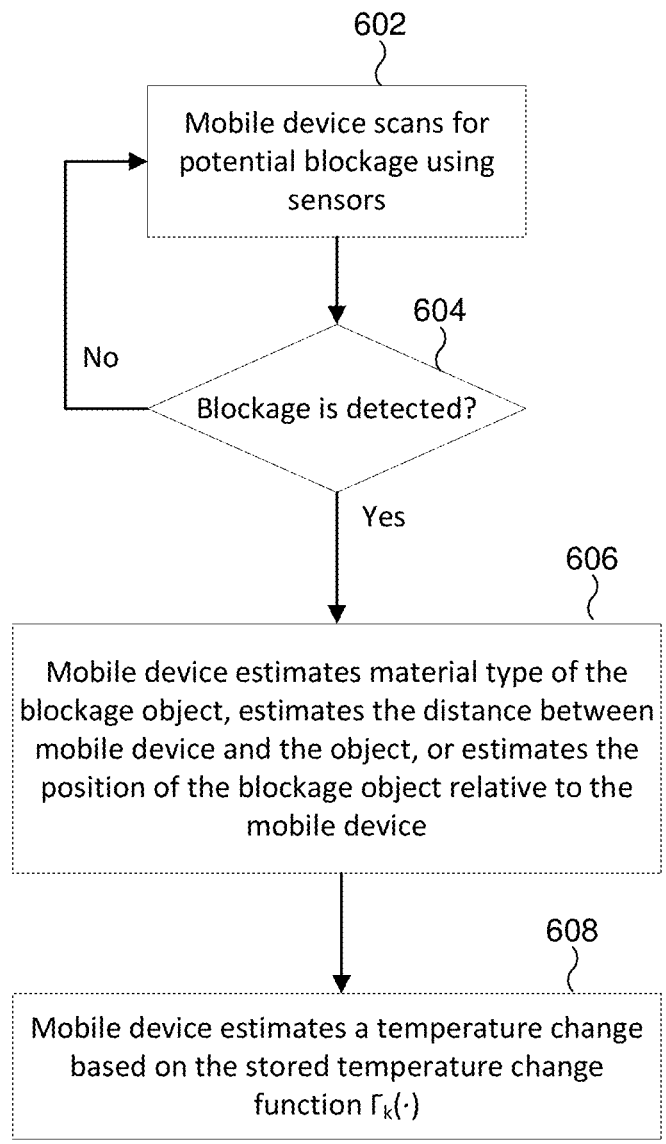
FIG. 6 illustrates an example process for temperature estimation and control based on blockage of antennas of a mobile device according to various embodiments of the present disclosure.

FIG. 6 illustrates an example process for temperature estimation and control based on blockage of antennas of a mobile device according to various embodiments of the present disclosure. As disclosed above, blockage of transmissions from antennas can affect the generation of heat within compartments 304 of a mobile device because blockage can result in retransmission of signals at a higher power, thereby generating greater waste heat than an unblocked transmission would. Blockage objects can also simply interfere with the thermal transmission of heat out of the mobile device, thereby impeding heat dissipation from compartments 304. Blockage can be detected by a mobile device, information about the blockage can be determined, and the determined blockage information can be used for temperature control.

A mobile device can be equipped with diverse sensors which include but are not limited to a gyroscope, an accelerometer, a magnetometer, a camera, a proximity sensor, an infrared (IR) light sensor, an ambient light sensor (ALS), and biometric sensors. All of these sensors can be used to detect whether a mobile device is experiencing blockage, to estimate the material of the blockage object, and to estimate the distance of the object from the mobile device.

For example, a camera or ALS can be used to detect whether there is any blockage of antenna signals. The camera or ALS can capture light and detect whether the strength of captured light is higher than a first threshold. If the captured light strength is higher than the first threshold, there may be no blockage in the area near the camera or ALS (i.e., there is no object that visually obstructs the camera or ALS sufficiently enough to be considered a blockage). If the captured light strength is lower than the first threshold, a light source of the mobile device near to the camera or ALS can be turned on to emit light outwards. The camera or ALS can then detect light that is reflected from the mobile device's light source. If the strength of the captured light is higher than a second threshold, this indicates that the light has reflected off of an object, and there may be blockage. If the strength is lower than the second threshold, this indicates that there is no object for light to reflect from, and there is no blockage.

This emission-and-sensing based blockage detection scheme can also be applied to a blockage detection scheme based on a proximity sensor. A proximity sensor can be used in cooperation with an infrared LED and light detector to detect a potential blockage. First, a proximity sensor or an infrared LED emits a beam of electromagnetic (EM) radiation, such as infrared light. Then, the proximity sensor attempts to detect whether the emitted radiation is reflected back. If a reflected signal is detected, this indicates that there is blockage in the direction of the radiation emission. If no reflected signal is detected, this indicates that there is no blockage.

A biometric sensor, such as a fingerprint sensor, can also be used for blockage detection. If the fingerprint sensor is used, this indicates that there may be blockage in the area near the fingerprint sensor. That is, when the fingerprint sensor is used, it can be deduced that a user's finger is covering the fingerprint sensor and therefore causing blockage of the area around the fingerprint sensor.

Different types of blockage material will have different impacts on the heat dissipation of a mobile device. Knowing information about the material that a blockage object is comprised of can assist in temperature control of the mobile device. Objects made of different materials may have different reflection characteristics. For example, in the above emission-and-detection scheme, when a mobile device is put into a user's pocket, the fabric of the pocket will reflect a large portion of the emitted visible light, while emitted infrared light or other lower frequency EM radiation is not reflected by the fabric significantly. In another example, a metal plate causes strong reflection of both visible light and lower frequency EM radiation. The mobile device can use this information to estimate the material of a blockage object based on comparison of reflection of different types of radiation gathered using multiple sensors, such as a camera, ALS, proximity sensor, and infrared sensor.

At different distances, a blockage object may have different impacts on the heat dissipation of a mobile device. The above emission-and-detection scheme can also be used to estimate the distance of a blockage object from the mobile device. For example, after camera- or ALS-based detection results indicate there is a blockage object, the distance to the object can be estimated based on the strength of the radiation reflected from the object. Due to attenuation of EM radiation as it propagates, the mobile device can deduce that if the strength of the reflected radiation is high, the distance from the object to mobile device is small. Likewise, if the strength of the reflected radiation is small, the distance from the object to mobile device is large.

In another embodiment, the distance to the object can be estimated based on the propagation time of the radiation. If the time of emission and reception of EM radiation are denoted as $t_1$ and $t_2$, respectively, then the distance d of the object from the mobile device can be estimated as $$d = \frac{c \cdot (t_2 - t_1)}{2},$$

where c is the speed of light.

If there are blockage objects, the internal temperature of a mobile device should rise faster than the case where there is no blockage object for the reasons described above. A metal blockage object should also cause faster temperature increases than blockage by a cotton fiber object. Likewise, a closer blockage object can result in faster temperature increases than a distant object. Different positions (e.g., different elevations or azimuth angles) of the blockage object relative to the mobile device should also have different impacts on heat dissipation of the mobile device. For example, some compartments 304 may have their heat dissipation impeded by the object, while other compartments 304 are less affected or unaffected. The position of the blockage object relative to the mobile device can be estimated from the location of the sensors used for blockage detection. For example, in a case where a rear-facing camera or ALS indicates that there is blockage, then it can be deduced that the blockage object is located on the back side of the mobile device. If a proximity sensor (e.g., a fingerprint reader) on the front of the mobile device detects blockage, it can be deduced that a blockage object is in front of the mobile device.

In one example, there are M blockage objects. In this example, $\alpha_m$ denotes the position of a blockage object m relative to the mobile device, $\beta_m$ denotes an index of the material of the blockage object within a list of possible blockage, $\rho_m$ denotes the estimated distance from the object to the mobile device, and $\Delta t_m$ denotes the time duration for which the blockage object blocks the mobile device. The temperature change in the k-th compartment 304 is denoted by $\phi_k$. The connection between the blockage object and the temperature of a compartment 304 is described by the function $\Gamma(\bullet)$, which can be stored in a memory of the mobile device as a mathematical equation or as a pre-calculated lookup table. The impact of the m-th blockage object on the temperature of the k-th compartment is denoted as $\phi_k = \Gamma_k(\alpha_m, \beta_m, \rho_m, \Delta t_m)$.

Referring now to FIG. 6, at step 602, the mobile device uses sensors as described above to attempt to detect existence of a blockage object. At determination block 604, the mobile device determines whether or not a blockage object was detected. If not, the method returns to step 602, the mobile device continues scanning for blockage objects, and the temperature control system ignores blockage objects in managing the temperature of the compartments 304. If a blockage object is detected, the method proceeds to step 606, and the sensors are used to estimate at least one of the material type of the blockage object, the distance of the object to the mobile device, or the position of the blockage object relative to the mobile device. Then, at step 608, the mobile device uses the estimated material type, the distance of the blockage object from the mobile device, and the relative position of the blockage object to estimate temperature change $\phi_k$ of the k-th compartment 304 based on the temperature change function $\Gamma_k(\bullet)$.

Figure 7:
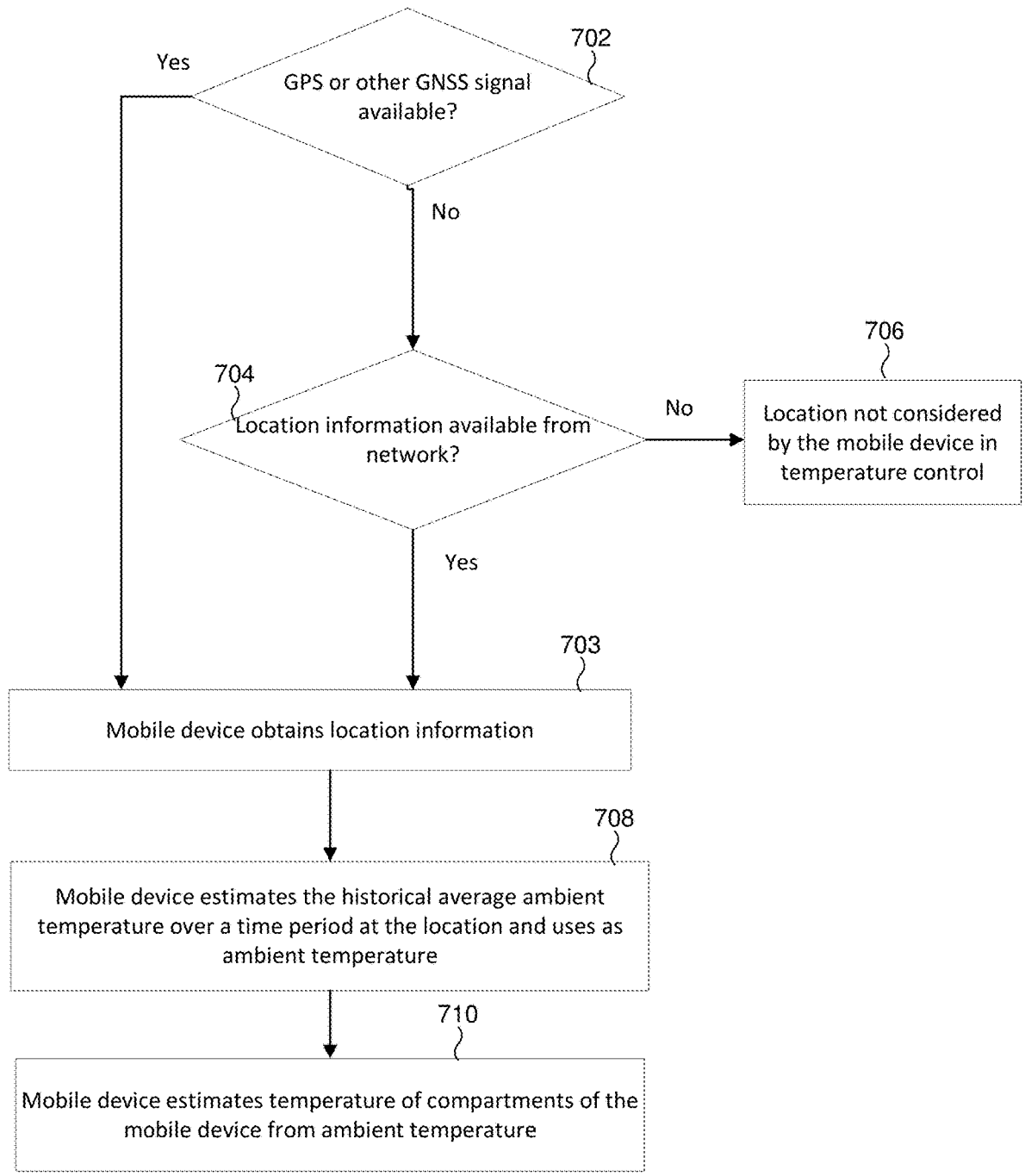
FIG. 7 illustrates an example process for temperature estimation and control using external factors according to illustrative embodiments of the present disclosure.

FIG. 7 illustrates an example process for temperature estimation and control using external factors according to illustrative embodiments of the present disclosure. External factors can include, for example, location and time information from GPS or another satellite navigation system (GNSS), location information from serving base stations, resources from the Internet, or the like. At a given geographic location, and at a given time of year, the ambient weather conditions may have an impact on the ability of a mobile device to dissipate heat. For example, the heat produced by the components of a mobile device can be dissipated to the air outside of the mobile device much easier in cooler ambient temperatures than in hotter ambient temperatures. In another example, whether the mobile device is inside in a climate-controlled setting or outside without climate control may affect the ability of the mobile device to dissipate heat. Knowledge of these ambient conditions can therefore be useful in forming a temperature control plan of the mobile device.

Beginning at decision block 702, the mobile device checks whether a signal from a GPS or other GNSS can be detected. If a GPS or other GNSS signal is available, the location and time information of the mobile device is obtained from the GNSS at step 703. If the GPS or other GNSS signal is not available, then at decision block 704 the mobile device checks whether network facilities, such as a base station, can provide location and time information to the mobile device. If the network facilities cannot provide the location and time information either, then at step 706 the temperature control system does not consider the location and time information in forming a temperature control plan for the mobile device. If the location and time information are available from the network facilities, then the mobile device obtains the location and time information at step 703.

At step 708 the mobile device estimates the ambient temperature conditions in the device's proximity based on historical data for the obtained location and time. In this example, $\zeta$ denotes the geographic location of the mobile device (e.g., longitude, latitude, and altitude) and $\nu$ denotes the current time (i.e., date and time of day). The ambient temperature around the mobile device is denoted by $\Omega_1$. Knowing $(\zeta,\nu)$, $\Omega_1$ can be estimated as the average historical temperature within that time period $\nu$ (e.g., the average temperature at the same or similar date and time of day in previous years, or the average temperature in previous days) at the location $\zeta$. This historical temperature information can be obtained externally (e.g., through the Internet or from data stored at network facilities such as a serving base station) or can be stored internally on the mobile device.

The connection between the ambient temperature $\Omega_1$ and the temperature of a compartment 304 of the mobile device is described by the function $P(\bullet)$, such that $\Omega_1=P(\zeta,\nu)$. At step 710, the mobile device estimates $\Omega_1=P(\zeta,\nu)$ in order to estimate the temperature of a compartment 304 based on the ambient temperature $\Omega_1$ around the mobile device. In some embodiments, values of $P(\bullet)$ for various inputs can be pre-calculated and stored in the mobile device as a lookup table, while in other embodiments $P(\bullet)$ is calculated at runtime. The estimated ambient temperature $\Omega_1$ can thereby be used for making a temperature control plan of the mobile device.

Figure 8:
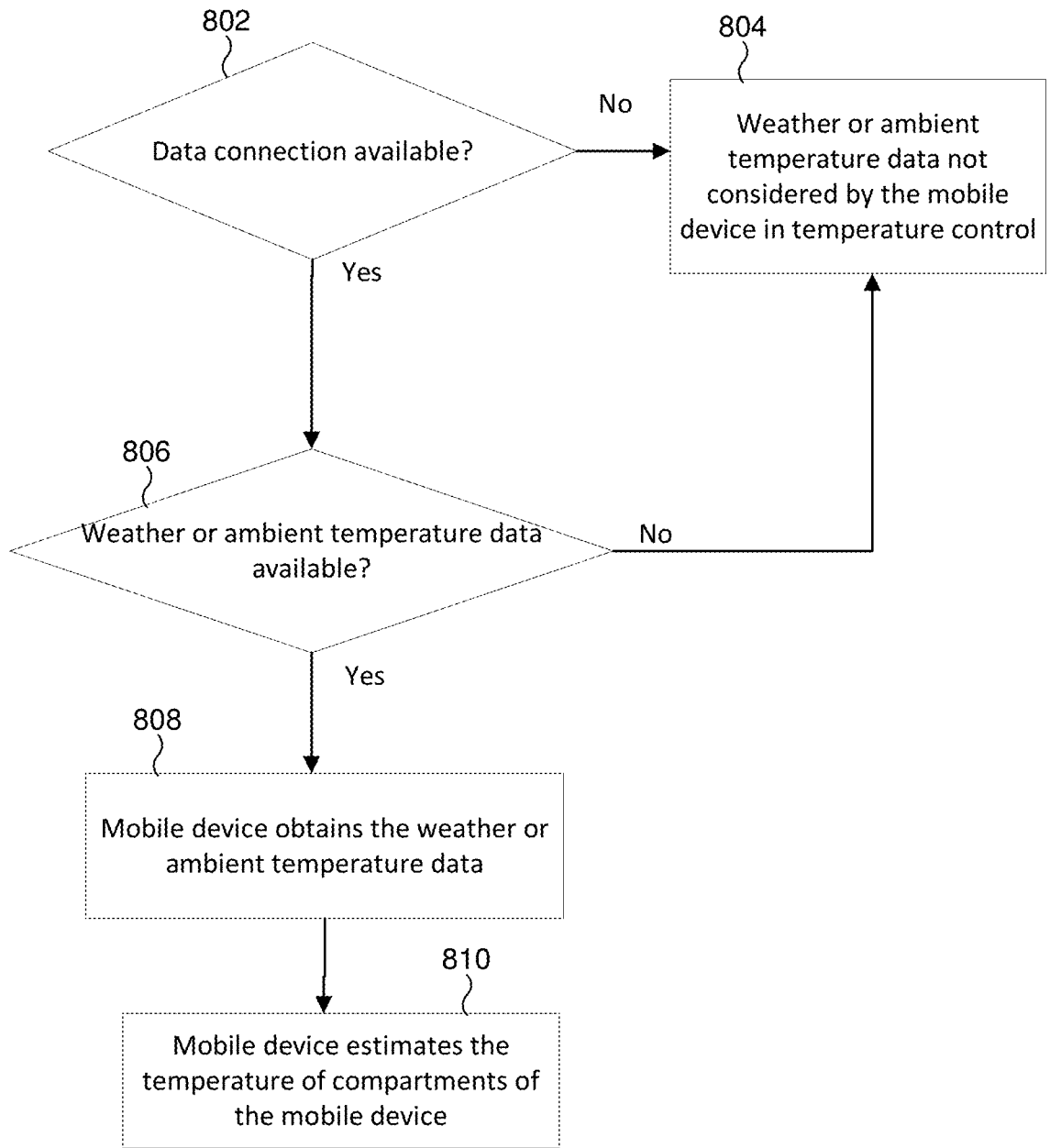
FIG. 8 illustrates an example process for temperature estimation and control using external factors according to illustrative embodiments of the present disclosure.

FIG. 8 illustrates an example process for temperature estimation and control using external factors according to illustrative embodiments of the present disclosure. In this embodiment, the external factors used are ambient weather or temperature data, such as data from an Internet meteorological service. In this embodiment, it is assumed that the mobile device is aware of its location, for example by the use of a GNSS as described above with respect to FIG. 7. As noted above with respect to FIG. 7, knowledge of these ambient conditions can be useful in forming a temperature control plan of the mobile device.

Beginning at decision block 802, the mobile device checks whether a data connection (e.g., an Internet connection) is available. If a data connection is not available, then at step 804 the temperature control system of the mobile device does not consider weather or ambient temperature conditions in forming a temperature control plan for the mobile device. If a data connection is available, then at decision block 806 the mobile device determines whether current weather or ambient temperature data at the location of the mobile device can be obtained from any source over the data connection (e.g., from an Internet meteorological service). If no current weather data can be located, then the process moves to step 804 as described above, and the temperature control system of the mobile device does not consider weather or ambient temperature conditions in forming a temperature control plan for the mobile device. If current weather or ambient temperature data is available, then the mobile device obtains that information over the data connection at step 808.

As described above with respect to FIG. 7, if the ambient temperature around the mobile device at location $\zeta$ and time $\nu$ is denoted by $\Omega_1$, then the connection between the ambient temperature $\Omega_1$ and the temperature of a compartment 304 of the mobile device is described by the function $P(\bullet)$, such that $\Omega_1=P(\zeta,\nu)$. At step 810, the mobile device estimates $\Omega_1=P(\zeta,\nu)$ in order to estimate the temperature of a compartment 304 based on the ambient temperature $\Omega_1$ around the mobile device. In some embodiments, values of $P(\bullet)$ for various inputs can be pre-calculated and stored in the mobile device as a lookup table, while in other embodiments $P(\bullet)$ is calculated at runtime. The externally-obtained ambient temperature $\Omega_1$ can thereby be used for making a temperature control plan of the mobile device.

Figure 9:
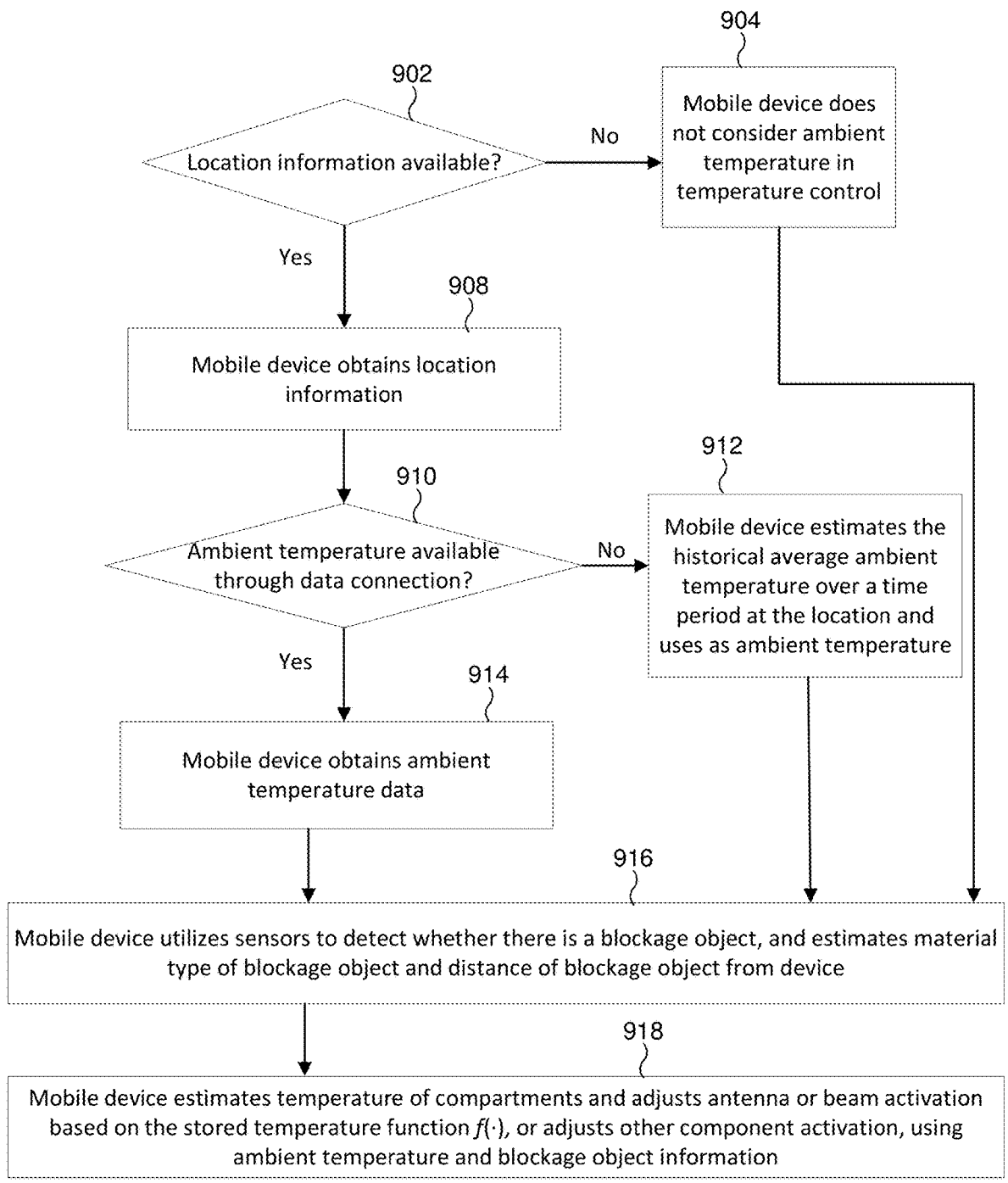
FIG. 9 illustrates an example process for temperature estimation and control using a combination of external factors and sensor measurements according to illustrative embodiments of the present disclosure.

FIG. 9 illustrates an example process for temperature estimation and control using a combination of external factors and sensor measurements according to illustrative embodiments of the present disclosure. In this embodiment, both location and time information, as described with respect to FIG. 7, as well as externally-obtained ambient temperature data, as described with respect to FIG. 8, are considered by a temperature control system of the mobile device. The mobile device in this embodiment additionally considers sensor measurements to determine whether there is blockage, as described with respect to FIG. 6, and activation characteristics of heat-emitting components, as described with respect to FIGS. 5A and 5B, to form a temperature control plan of the mobile device.

Beginning at decision block 902, the mobile device checks whether location data is available. This includes checking whether a signal from a GPS or other GNSS can be detected as well as checking whether network facilities, such as a base station, can provide location and time information. If location information cannot be determined, then at step 904 the mobile device does not consider ambient temperature around the device in temperature control. If location information is available, then at step 908 the mobile device obtains the location information.

At decision block 910, the mobile device determines whether current weather or ambient temperature data at the location of the mobile device can be obtained from any source over a data connection (e.g., from an Internet meteorological service). If no current weather data can be located, then the process moves to step 912 and estimates the ambient temperature at the device's location based on the obtained location and time information only, as described above with respect to step 708 of FIG. 7. If ambient temperature data at the location of the device is available from an external source via the data connection, then at step 914 the mobile device obtains this ambient temperature data over the data connection.

After the ambient temperature around the device has been determined at either step 912 or 914, or if the device has determined at step 904 not to consider the ambient temperature, the mobile device, at step 916, attempts to detect any blockage objects using its sensors, as described above with respect to FIG. 6. The mobile device additionally estimates a material type of any detected blockage object as well as a distance of any detected blockage object from the mobile device, as described above with respect to FIG. 6.

At step 918, the mobile device estimates the temperature of at least one compartment 304 based on the ambient temperature information, if available, and the blockage object information, if available. For example, this estimation can be performed as described above with respect to FIGS. 6, 7, and 8. The estimated temperature of compartment 304 can then be used in conjunction a stored temperature function $f(\cdot)$, which is used to select antennas and beams to be activated, and to make a temperature control plan for the activated antennas, beams, and their activation duration and power such that the temperature of the compartment 304 will be no higher than a predetermined threshold, as described above with respect to FIGS. 5A and 5B. For example, the function $f(\cdot)$ can be called in step 918 if it is determined that the temperature in a compartment 304 is over the predetermined threshold. Additionally, the mobile device at step 918 can adjust the activation characteristics of other heat-emitting components in the compartment 304 as part of the temperature control plan for the compartment 304.

Embodiments of this disclosure can take various actions to control the temperature within a compartment 304 of a mobile device. Different actions can be taken depending on the type of components that are emitting heat within a given compartment 304. When the temperature control plan includes adjusting the beam codebook and activation characteristics of antennas or beams, and the mobile device knows the direction of any beam generated by antennas in the compartment 304, then various smart heat reduction actions can be performed to reduce or avoid signal strength degradation while reducing waste heat emitted by the antennas.

In some embodiments, smart heat reduction includes turning off an antenna that is producing a current beam and activating another antenna or antennas which can point a beam in a similar direction as the current beam. If there are multiple such antennas, the mobile device can select the antenna in a compartment 304 that currently has the lowest temperature. Alternatively, the mobile device can select the antenna that is farthest away from the compartment 304 that contains the antenna generating the current beam (i.e., the compartment 304 that is currently overheated). In addition, the mobile device can change its beam codebook to a different codebook which does not include beams generated by the antenna generating the current beam.

When a blockage object is detected, smart heat reduction can include turning off an antenna that is in a compartment 304 that is being blocked and activating another antenna that is not determined to be blocked (or which has less impactful blockage). If there are multiple such antennas, the mobile device can select the antenna in a compartment 304 that currently has the lowest temperature. Alternatively, the mobile device can select the antenna that is farthest away from the compartment 304 that contains the antenna generating the current signal (i.e., the compartment 304 that is currently overheated). In addition, the mobile device can change its beam codebook to a different codebook which only consists of beams generated by antennas that are not determined to be blocked.

In some embodiments, the mobile device may determine that no alternative antennas can perform as a satisfactory substitute for the currently activated antenna in the overheated compartment 304. In such cases, the mobile device can reduce the activation power of the currently activated antenna in order to reduce the heat generated by the antenna. Alternatively, the mobile device can reduce the activation duration of the antenna (e.g., by scheduling bursts of transmission rather than constant transmission, or otherwise limiting the total consecutive duration for which the antenna can operate).

When the temperature control plan includes adjusting activation characteristics of non-antenna components, such as display drivers, batteries, processors, and the like, smart heat reduction can include putting one or more of these components into power saving mode (e.g., reducing screen brightness of a display or limiting processing cycles of a processor). Smart heat reduction can also include turning off idle applications or background applications on the mobile device, thereby reducing processor use and reducing battery draw. For example, any background application that is unused for a predetermined period of time could be terminated to reduce processor use. It is understood that a temperature control plan for a compartment 304 can include both adjusting activation characteristics of antennas in the compartment 304 as well as adjusting activation characteristics of non-antenna components.

Figure 10:
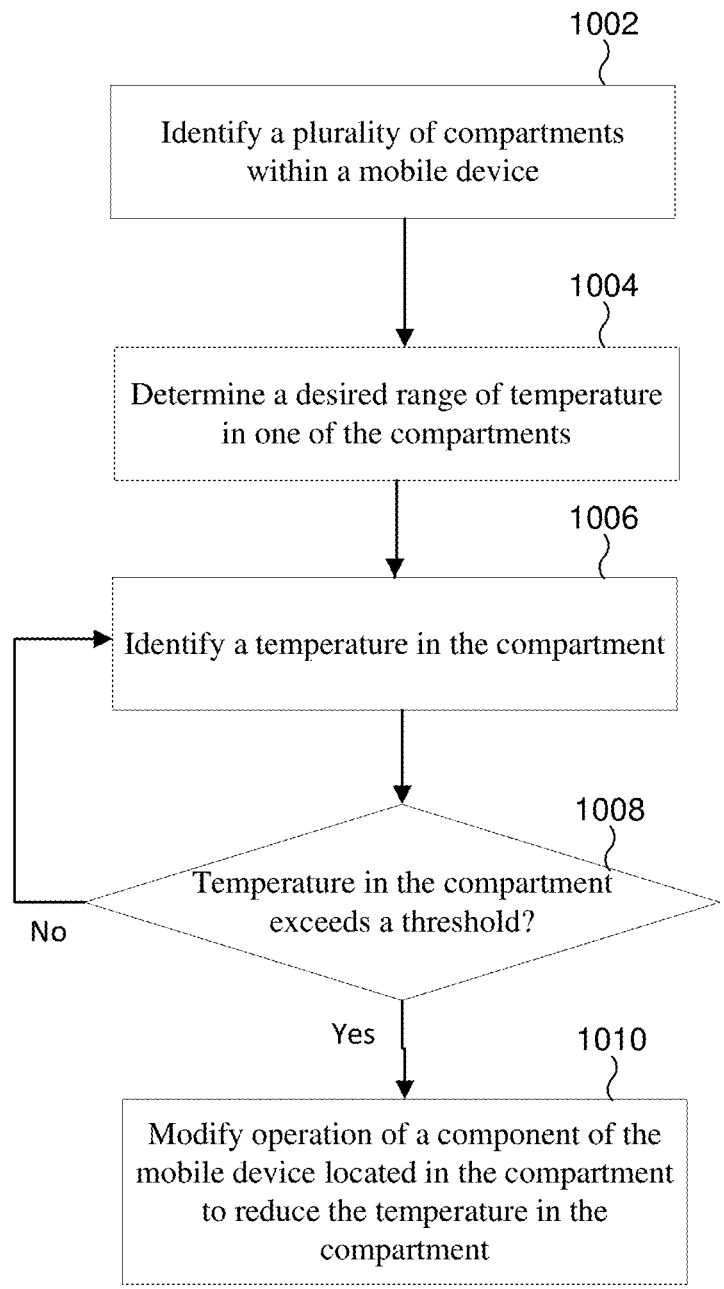
FIG. 10 illustrates an example method of compartment identification and temperature control of compartments according to illustrative embodiments of the present disclosure.

FIG. 10 illustrates an example method of compartment identification and temperature control of compartments according to illustrative embodiments of the present disclosure. For convenience, the method of FIG. 10 is implemented on a mobile device as described above, and performed by a processor of the mobile device. It is understood that this mobile device could be any other suitable electronic device.

Beginning at step 1002, the mobile device identifies a plurality of compartments within the mobile device. This includes designating a portion of the mobile device as one of the plurality of compartments by at least one of determining a number of heat-emitting components within the portion of the mobile device or determining a level of heat tolerance of one or more heat-sensitive components within the portion of the mobile device. For convenience, the remainder of the method will be described with respect to one compartment, but it is understood that the method can be applied to any number of compartments.

At step 1004, the mobile device determines a desired range of temperature in the identified compartment based on a heat tolerance of the heat-sensitive components in the compartment. In some embodiments, this desired range of temperature is used to determine a threshold temperature for the compartment, above which the temperature in the compartment should not rise.

At step 1006, the mobile device identifies the temperature in the compartment. Identifying the temperature can include, in one embodiment, detecting a blockage object with at least one sensor of the mobile device, where the blockage object is an object that increases heat emission or blocks heat dissipation from components located in the compartment. The mobile device can also estimate a material type of the blockage object with the sensor, estimate a distance of the blockage object from the mobile device with the sensor, estimate a position of the blockage object relative to the mobile device, and estimate a temperature change caused by the blockage object in the compartment based on the above estimated characteristics of the blockage object. In another embodiment, identifying the temperature in the one compartment includes estimating the temperature based on information about an activation characteristic of at least one component located in the compartment.

In yet another embodiment, identifying the temperature in the compartment includes determining an ambient temperature around the mobile device. Determining the ambient temperature around the mobile device includes determining a geographic location of the mobile device, determining historical temperature information for the determined geographic location, and estimating, based on the geographic location of the mobile device and the historical temperature information, the ambient temperature at the geographic location of the mobile device.

At decision block 1008, the mobile device determines whether the identified temperature in the compartment exceeds a threshold for the compartment. If the identified temperature does not exceed the threshold, the method returns to step 1006 and updates the identification of the temperature. If the temperature does exceed the threshold, then at step 1010 the mobile device modifies, based on the identified temperature, operation of a component of the number of heat-emitting components that is located in the compartment to reduce the temperature in the compartment. Modifying the operation of the component located in the compartment includes modifying an activation characteristic of the component. In some embodiments, the component can include an antenna, and the activation characteristic of the component includes an activation status, an activation duration, or an activation power of the antenna.

Although the present disclosure has been described with exemplary embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
   heat-emitting components;
   a plurality of non-overlapping compartments, wherein at least some of the compartments are not physically separated from each other; and
   a processor configured to:
   designate a particular portion of an internal space of the electronic device as one of the compartments by determining a number of the heat-emitting components that are within the particular portion of the internal space;
   identify a temperature in one of the compartments of the electronic device;
   determine whether the identified temperature in the one compartment exceeds a threshold for the one compartment; and
   in response to determining that the identified temperature for the one compartment exceeds the threshold, modify, based on the identified temperature, operation of a component of the heat-emitting components that is located in the one compartment to reduce the temperature in the one compartment.

2. The electronic device of claim 1, wherein the processor is further configured to determine a desired range of temperature in the one compartment based on a heat tolerance of one or more heat-sensitive components that are in the one compartment.

3. The electronic device of claim 1, further comprising:
   a sensor,
   wherein in order to identify the temperature in the one compartment, the processor is further configured to:
   detect a blockage object with the sensor, wherein the blockage object comprises an object that blocks heat dissipation from the component located in the one compartment;
   estimate a material type of the blockage object with the sensor;
   estimate a distance of the blockage object from the electronic device with the sensor;
   estimate a position of the blockage object relative to the electronic device; and
   estimate a temperature change caused by the blockage object in the one compartment based on the estimated material type of the blockage object, the estimated distance of the blockage object from the electronic device, and the estimated position of the blockage object relative to the electronic device.

4. The electronic device of claim 1, wherein in order to identify the temperature in the one compartment the processor is further configured to estimate the temperature based on information about an activation characteristic of the component located in the one compartment.

5. The electronic device of claim 1, wherein in order to identify the temperature in the one compartment the processor is further configured to determine an ambient temperature around the electronic device.

6. The electronic device of claim 5, wherein in order to determine the ambient temperature around the electronic device the processor is further configured to:
   determine a geographic location of the electronic device;
   determine historical temperature information for the determined geographic location; and
   estimate, based on the geographic location of the electronic device and the historical temperature information, the ambient temperature at the geographic location.

7. The electronic device of claim 5, wherein in order to determine the ambient temperature around the electronic device the processor is further configured to:

determine a geographic location of the electronic device; and receive, from a source external to the electronic device, the ambient temperature at the geographic location.

8. The electronic device of claim 1, wherein:

the component includes an antenna, and an activation characteristic of the component includes an activation duration of the antenna, and in order to modify the operation of the component located in the one compartment the processor is configured to modify the activation characteristic of the component.

9. The electronic device of claim 1, wherein the processor is further configured to, in response to determining that the identified temperature for the one compartment exceeds the threshold, terminate a background application that has not been used for a predetermined amount of time.

10. A method for operating an electronic device, the method comprising:

designating, by a processor of the electronic device, for a plurality of non-overlapping compartments of the electronic device, a particular portion of an internal space of the electronic device as one of the compartments by determining a number of heat-emitting components that are within the particular portion of the internal space, wherein at least some of the compartments are not physically separated from each other;

identifying, by the processor, a temperature in one of the compartments;

determining, by the processor, whether the identified temperature in the one compartment exceeds a threshold for the one compartment; and in response to determining that the identified temperature for the one compartment exceeds the threshold, modifying, by the processor based on the identified temperature, operation of a component of the heat-emitting components that is located in the one compartment to reduce the temperature in the one compartment.

11. The method of claim 10, further comprising determining a desired range of temperature in the one compartment based on a heat tolerance of one or more heat-sensitive components that are in the one compartment.

12. The method of claim 10, wherein identifying the temperature in the one compartment comprises:

detecting a blockage object with a sensor, wherein the blockage object comprises an object that blocks heat dissipation from the component located in the one compartment;

estimating a material type of the blockage object with the sensor;

estimating a distance of the blockage object from the electronic device with the sensor;

estimating a position of the blockage object relative to the electronic device; and estimating a temperature change caused by the blockage object in the one compartment based on the estimated material type of the blockage object, the estimated distance of the blockage object from the electronic device, and the estimated position of the blockage object relative to the electronic device.

13. The method of claim 10, wherein identifying the temperature in the one compartment includes estimating the temperature based on information about an activation characteristic of the component located in the one compartment.

14. The method of claim 10, wherein identifying the temperature in the one compartment includes determining an ambient temperature around the electronic device.

15. The method of claim 14, wherein determining the ambient temperature around the electronic device includes:

determining a geographic location of the electronic device;

determining historical temperature information for the determined geographic location; and estimating, based on the geographic location of the electronic device and the historical temperature information, the ambient temperature at the geographic location.

16. The method of claim 14, wherein determining the ambient temperature around the electronic device includes:

determining a geographic location of the electronic device; and receiving, from a source external to the electronic device, the ambient temperature at the geographic location.

17. The method of claim 10, wherein:

the component includes an antenna, and an activation characteristic of the component includes an activation duration of the antenna, and modifying the operation of the component located in the one compartment includes modifying the activation characteristic of the component.

18. The method of claim 10, further comprising, in response to determining that the identified temperature for the one compartment exceeds the threshold, terminating a background application that has not been used for a predetermined amount of time.

* * * * *